United States Patent [19]
Yoshihashi et al.

[11] 4,050,750
[45] Sept. 27, 1977

[54] TWO-PIECE MASTER TRACK LINK

[75] Inventors: Akira Yoshihashi, Hirakata; Hiraku Yamada, Kyoto, both of Japan

[73] Assignee: Kabushiki Kaisha Komatsu Seisakusho, Tokyo, Japan

[21] Appl. No.: 595,032

[22] Filed: July 11, 1975

[51] Int. Cl.² ............................................. B62D 55/28
[52] U.S. Cl. ..................................... 305/54; 305/58 R
[58] Field of Search ................. 305/58 R, 39, 54; 74/258, 247, 248

[56] References Cited
U.S. PATENT DOCUMENTS

| | | | |
|---|---|---|---|
| 3,096,661 | 7/1963 | Reinsma et al. | 305/39 X |
| 3,822,923 | 7/1974 | Stedman | 305/58 |

*Primary Examiner*—Stanley H. Tollberg
*Assistant Examiner*—John P. Shannon
*Attorney, Agent, or Firm*—Armstrong, Nikaido & Marmelstein

[57] ABSTRACT

A two-piece master track link for connecting an endless track which is parted into two link parts along an approximately diagonal juncture defined by respective opposite mating surfaces of the pieces. Each of the two parts has a cavity corresponding to each other to form a substantially cylindrical hollow space where a traction and thrust bearing member is tightly fitted. Shoe bolts extend from the outside of a track shoe to one of the link parts through the other part so that both the link parts are fixedly secured to each other together with the track shoe. Thus, the assembly and disassembly of the endless track is simplified.

10 Claims, 6 Drawing Figures

TWO-PIECE MASTER TRACK LINK

BACKGROUND OF THE INVENTION

1. Field of the Invention:

This invention relates to master track links, and more particularly to two-piece master track links for connecting an endless track of the type used in chains, track-type tracks and other articulated devices of a similar nature, especially in an endless track of a small sized bulldozer.

2. Description of the Prior Art:

In a track-type vehicle such as a bulldozer, an endless track comprises a plurality of track shoes carried by links which are pivotally connected by means of hinge pins and bushings.

It is conventional to provide a master pin or a master link in each continuous chain of links which may be retained securely in place while still permitting separation of the link chain for disassembly of the endless track from the vehicle. Master link connections normally comprises two link parts, each being adapted to receive a pin and having a mating surface to couple and interlock with that of the other link part. The respective mating surfaces of the link parts define a juncture of the master track link and each has an interlocking contact surface, these surfaces coacting to resist tensile force ad thrust force exerted on the link at the pin connections of each link part. Suitable means such as screws maintain the link parts in their mating interlocked relation while they are disposed within an endless track.

Pertinent prior art two-piece master track links disclosed in U. S. Pat. Nos. 3,427,079 and 3,822,923 have proven functionally effective. However, as to U. S. Pat. No. 3,427,079, it have been found difficult and costly to manufacture. Close tolerances are required to assure optimum coupling of the interlocking surfaces and alignment of the shoe bolts which respectively secure the track shoes associated link parts. Although the master pin requires a relative loose tolerances as compared with that of the regular pin in order to facilitate the connection and disconnection of the endless track, it is still required to use a hydraulically actuated tool or a manually actuated hammer for assemblying and disassemblying the endless track at the field of work, thereby rendering the assembly and disassembly of the endless track troublesome and difficult. Further, if the tolerances of the master pin is loosened too much, the master pin tends to be drawn out of the mating portion of the endless track, thereby resulting in damage in the endless track.

In addition, without a tight fit to minimize flexing between the link parts, concentrated stress loads and malfunction of hinge joints can occur with consequent progressive deterioration of the entire track chain. Contour grinding is an effective way of attaining the required precision machining of the extremely hard link members but such grinding is time consuming, costly and involved because the complex and expensive grinding wheel must be frequently refinished to maintain the desired tolerances.

Whereupon, U. S. Pat. No. 3,822,923 has been made to avoid the above described disadvantages. However, such U. S. Patent merely aims to minimize the above described manufacturing problems, and therefore it is still disadvantageous in that the mating surfaces of the two link parts lack in toughtfull consideration of withstanding thrust force exerted thereon at the pin connections of each link part. Namely, each of the mating surfaces of the subject master track link of U. S. Pat. No. 3,822,923 is provided with semicylindrical notches which register with corresponding complementing notches in the associated link part and receive close fitting cylindrical lock and shear keys. Such shear keys are further provided with diametral bores which receive shoe bolts used to secure the two link parts to each other together with the track shoe so as to prevent the shear keys from disengagement thereof. As a result, shearing strength of each shear key is remarkably reduced.

This invention contemplates to avoid all the above described disadvantages of the prior art two-piece master track link.

SUMMARY OF THE INVENTION

It is an object of the present invention to provide a novel and useful two-piece master track link for connecting an endless track which can minimize its manufacturing cost and facilitates the assemblying and disassemblying of the endless track without reducing the efficiency of withstanding tensile force and thrust force exerted thereon.

It is another object of the present invention to provide a novel and useful two-piece master track link separable into two link parts in which at least one traction and thrust bearing means, such as, for example, a knock pin, is provided between the two link parts in such a manner of preventing from disengagement thereof.

In accordance with a first aspect of the present invention, there is provided a two-piece master track link for connecting an endless track which has an outer surface for receiving a track shoe and an opposite inner surface, while at one side thereof is a pin connection bore for receiving and retaining a track pin and at the other side a pin bushing connecting bore for receiving the bushing of another track pin, the master track link being separable into two vertically overlapping and substantially half link parts which are tightly coupled and interlocked with each other along an approximately diagonal juncture defined by respective mating surfaces of the link parts by means of shoe bolts of which at least one of them extends from an outer surface of the track shoe to one link part of which an inner surface thereof occupies a larger part of the opposite inner surface of the master track link while passing through, in turn, the track shoe and the other link part of which an outer surface thereof coming into contact with the inner surface of the track shoe occupies a larger part of the outer surface of the master track link so that both the link parts and the track shoe are fixedly secured simultaneously with each other, the improvement characterized in that each of the respective mating surfaces of the link parts comprises a first diagonal surface part located at from one side end portion of the inner surface of the master track link to a vertical intermediate portion thereof, a second diagonal surface part located at from a diagonally opposite side end portion of the outer surface of the master track link to a vertical intermediate portion thereof, and an intermediate surface part parallel to the outer and inner surfaces of the master track link and connected between the first and second diagonal surface parts.

In the foregoing first aspect of the present invention, the respective intermediate surface part of the link parts is provided with at least a cavity which registers with another corresponding complementing cavity formed in the associated link part so as to form a hollow space in which a traction and thrust bearing means corresponding to the hollow space is tightly fitted by means of a press fit when both the link parts are coupled and interlocked with each other together with the track shoe.

In accordance with a second aspect of the present invention, there is provided the two-piece master track link as set forth in the first aspect wherein further comprises a recessed portion formed in said the other link part at its outer surface coming into contact with the inner surface of the track shoe, and at least one additional bolt extending from the bottom face of the recessed portion to said one link part while passing through said the other link part so that both the link parts are always coupled and interlocked by the additional bolt even when the track shoe is detached from the master track link by taking off the shoe bolts.

The above and other objects, features and advantages of the present invention will become apparent from the following description taken in conjunction with accompanying drawings in which like reference characters and numerals designate corresponding parts and components throughout all of views.

DETAILED DESCRIPTION OF THE PREFERRED EMBODIMENTS

Figure 1:
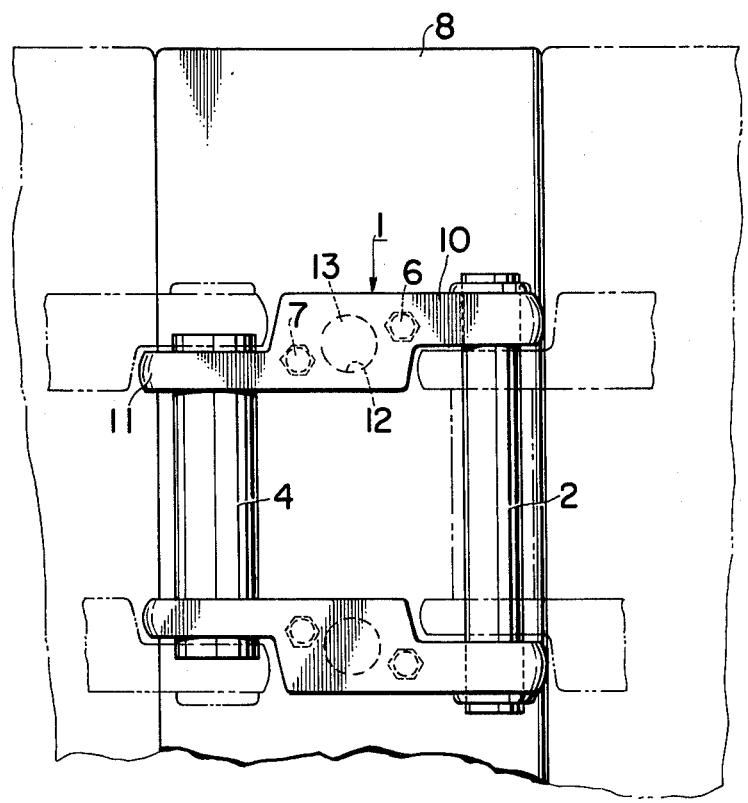
FIG. 1 is a fragmental plan view showing an endless track in which a first embodiment of the master track link of the present invention is used.
Figure 2:
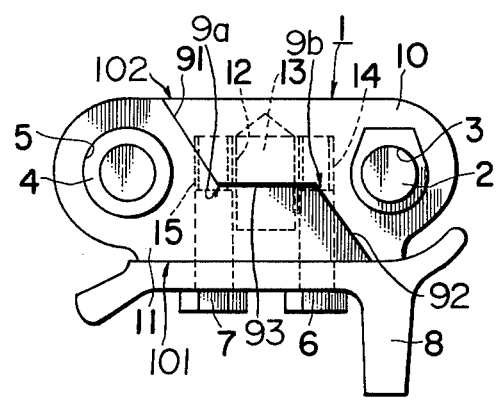
FIG. 2 is a side view of FIG. 1.

Referring now to FIGS. 1 and 2 which show a first embodiment of the two-piece master track link of the present invention, each of a pair of master track links 1, 1 has an outer surface 101 for receiving a track shoe 8 and an opposite inner surface 102, while at one side thereof there is provided a pin connection bore 3 for receiving and retaining a regular track pin 2 of an endless track of a track-type vehicle by means of, for example, a press fit and at the other side thereof there is provided a pin bushing connection bore 5 for receiving a bushing 4 of another regular track pin. The master track link 1 is separable into two vertically overlapping and substantially half link parts 10 and 11 which are tightly coupled and interlocked to each other along an approximately diagonal juncture defined by respective mating surfaces 9a and 9b of the link parts 10 and 11. The link part 10 is located at a substantial inner position of the endless track mounted on the track-type vehicle and, therefore, its inner surface occupies a larger part of the opposite inner surface 102 of the master track link 1, while the link part 11 is located at a substantial outer position of the link part 10 and the outer surface thereof occupies a larger part of the outer surface 101 of the master track link 1 and comes into contact with the inner surface of the track shoe 8. A pair of long cap screws 6 and 7, which are so called as shoe bolts, extend inwardly from the outer surface of the track shoe 8 while passing through, in turn, the track shoe 8, a pair of bores 14 and 15, respectively, in the outer link part 11 and threadedly engage the inner master link part 10, thereby easily and fixedly coupling and interlocking the link parts 10 an 11 to a master track link together with the track shoe. Thus, the connection of the opposite ends of the endless track in which the master track link 1 of the present invention is used is effected easily to facilitate mounting and dismounting of the endless track to and from the vehicle.

It is a characteristic feature of the present invention that each of the mating surfaces 9a and 9b of the inner and outer link parts 10 an 11, respectively, comprises a first diagonal flat surface part 91 located at from one side end portion of the inner surface 102 of the master track link 1 to a vertical intermediate portion thereof, a second diagonal flat surface part 92 located at from a diagonally opposite side end portion of the outer surface 101 of the master track link 1 to a vertical intermediate portion thereof, and an intermediate flat surface part 93 extending between the first and second diagonal surface parts 91 and 92 in a horizontal level parallel to both the outer and inner surfaces 101 and 102.

Further, in order to withstand traction force and thrust force exerted on the master track link 1 at the pin connection of each link part during operation of the endless track, a traction and thrust bearing means such as, for example, a knock pin 13 is provided between the inner and outer link parts 101 and 102 which is closely fitted into a corresponding hollow space 12 defined by corresponding complementing cavities formed in the inner and outer link parts 10 and 11, respectively, at their respective intermediate surfaced parts 93. The axis of the knock pin 13 extends in the direction perpendicular to the outer and inner surfaces 101 and 102 of the master track link 1. By the provision of the knock pin 13, any force acting between the two link parts 10 and 11 in the longitudinal direction of the endless track and perpendicular thereto with respect to th plane parallel to the inner and outer surfaces 101 and 102 of the master track link 1 can be withstood, while a force acting therebetween in the vertical direction of the master track link 1 by which the two link parts 10 and 11 tends to be separated from each other can be resisted by the shoe bolts 6 and 7. In addition, no shearing force is applied to the shoe bolts 6 and 7 by virtue of the provision of the knock pin 13. And, since each of the cavities in the inner and outer link parts 10 and 11 is formed in a blind hole, the knock pin 13 is positively prevented from being drawn out of the hollow space 12.

Figure 3:
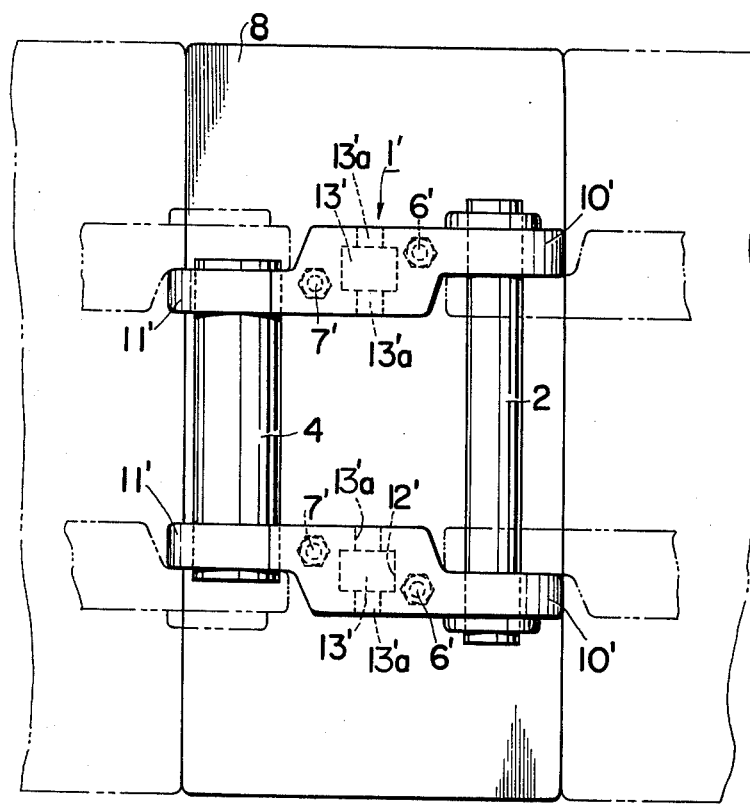
FIG. 3 is a fragmental plan view showing an endless track in which a second embodiment of the master track link of the present invention is used.
Figure 4:
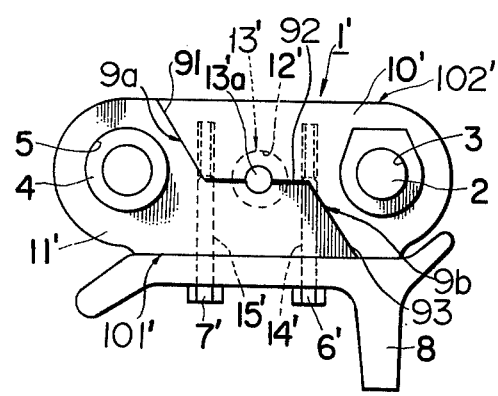
FIG. 4 is a side view view of FIG. 3.

Referring now to FIGS. 3 and 4 which show a second embodiment of the present invention basically similar to the first embodiment shown in FIGS. 1 and 2, identical parts to those of the first embodiment are represented by the same numerals and corresponding parts are indicated by the same numerals having single prime. In this second embodiment, the knock pin 13 used in the first embodiment shown in FIGS. 1 and 2 is replaced by a cylindrical member 13' having an intermediate enlarged diametral portion formed between the opposite end parts 13'a, 13'a thereof and closely fitted in a hollow space 12' corresponding thereto. The cylindrical member 13' is located in the direction parallel to the outer and inner surfaces 101' and 102' of the master track link 1' comprising the inner and outer link parts 10' and 11' and its axis is lying on the juncture of the link parts 10' and 11'.

Operation and function of the cylindrical member 13' are similar to those of the knock pin 13 of the first embodiment, and the member 13' is positively prevented from being drawn out of the master track link 1' by virtue of the intermediate enlarged diametral portion thereof. Thus, the assembly of the master track link 1' is greatly facilitated because of advantages caused by the configuration and orientation of the member 13' fitted in the hollow space 12'.

Figure 5:
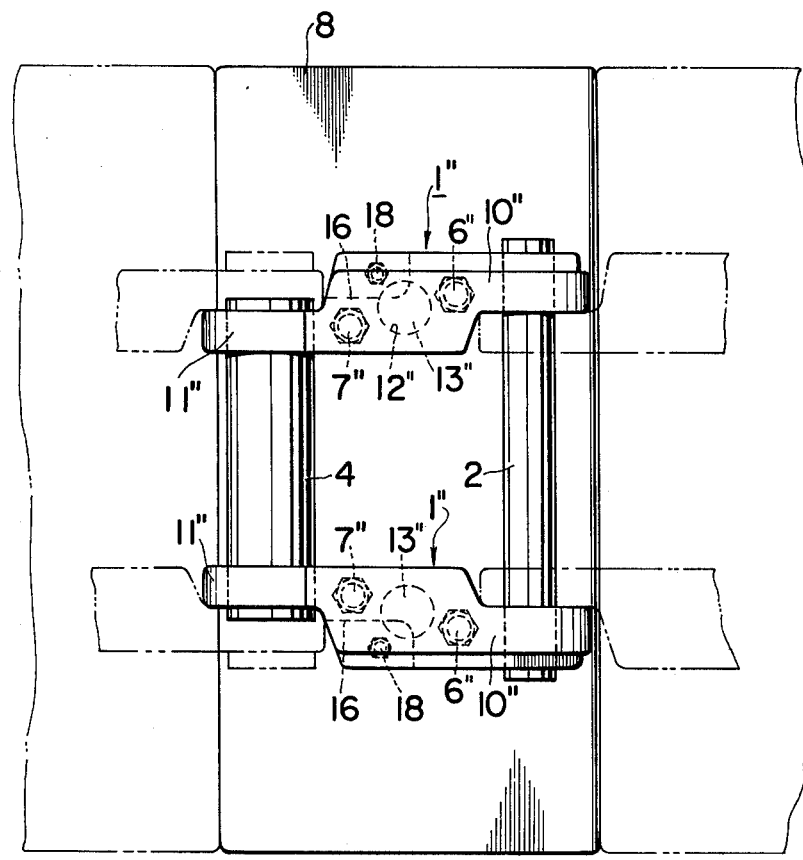
FIG. 5 is a fragmental plan view showing an endless track link in which a third embodiment of the master track link of the present invention is used.
Figure 6:
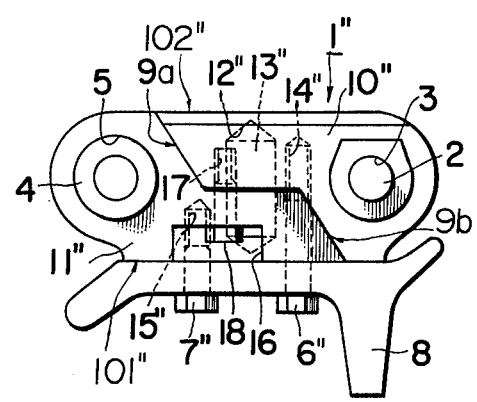
FIG. 6 is a side view of FIG. 5.

With reference to FIGS. 5 and 6, a third embodiment of the present invention is described hereinafter. This third embodiment is a slight modification of the first embodiment shown in FIGS. 1 and 2, and therefore identical portions are designated by the same numerals as in FIGS. 1 and 2, and further corresponding portions are shown by the same numerals having double prime. In the third embodiment, the knock pin 13'' fitted in a hollow space 12'' corresponding thereto is substantially identical with that of the first embodiment shown in FIGS. 1 and 2. However, the third embodiment is different from the first embodiment in that one of the shoe bolts 7'' does not extend into the inner link part 10'' from the shoe 8, but it terminates in the outer link part 11'' and threadedly engages therewith so as to secure the track shoe 8 to the outer link part 11'' only. Instead, an additional bolt 18 is provided between the inner and outer link parts 10'' and 11'' which extends inwardly from the bottom face of a recessed portion 16 formed in the outer link part 11'' while passing through a bore 17 in the outer link part 11'' and threadedly engage with the inner link part 10'' so that the inner and outer link parts 10'' and 11'' are positively secured by the additional bolt 18 to each other independently of the track shoe 8. The recessed portion 16 is formed in the outer surface of the outer link part 11'' at a longitudinally outer half and intermediate portion of the outer surface and has a space available to attach and detach the bolt 18 to and from the master track link 1''.

By the above construction of the third embodiment, the track shoe 8 is maintained in a manner of fixedly connecting relationship with the outer link part 11'' even though the inner link part 10'' is disconnected from the outer link part 11'' by loosening the shoe bolts 6'' and 18, thereby permitting to facilitate the assembly and disassembly of the master track link 1'' without carrying out the detachment of the track shoe 8.

It is apparent that the knock pin 13'' and the hollow space 12'' of the third embodiment may be replaced by the cylindrical member 13' and the hollow space 12' of the second embodiment shown in FIGS. 3 and 4, respectively, and thereby the same effect is achieved as in the second embodiment.

While the invention has been described hereinabove and shown with particular reference to the preferred embodiments, it will be apparent that variations are possible which would fall within the spirit of the present invention, which invention is not intended to be limited, except by the scope of the appended claims.

What is claimed as new and desired to be secured by letters patent of the under states is:

1. In a master track link for connecting an endless track which has an outer surface for receiving a track shoe and an opposite inner surface, while at one side thereof is formed a pin connection bore for receiving and retaining a track pin and at the other side thereof is formed a pin bushing connection bore for receiving the bushing of another track pin, said master track link being separable into two vertically overlapping and substantaily half link parts which are tightly coupled and interlocked with each other along an approximatley diagonal juncture defined by respective mating surfaces of said link parts by means of shoe bolts of which at least one of them extends from an outer surface of said track shoe to one link part while penetrating through the other link part adjacent to the track shoe so that both the link parts and the track shoe are fixedly secured simultaneously with each other, the improvement characterized in that each of said respective mating surfaces of said link parts comprises a first diagonal flat surface part located between one side end portion of said inner surface of said master track link and a vertically intermediate portion thereof, a second diagonal flat surface part located between a diagonally opposite side end portion of said outer surface of said master track link and a vertically intermediate portion thereof, an intermediate flat surface part extending between the first and the second diagonal surface parts in parallel to both said outer and inner surfaces of said master track link and at least one cavity which registers with another corresponding complementary cavity formed in the intermediate surface part of the associated link part so as to form a hollow space the longitudinal axis of which extends in a direction perpendicular to the outer and inner surfaces of said master track link between the link parts in which a traction and thrust bearing means corresponding to said hollow space is tightly fitted when said link parts are coupled and interlocked with each other together with said track shoe.

2. Master track link as set forth in claim 1, wherein; said hollow space is a substantially cylindrical configuration in which a traction and thrust bearing means corresponding to said hollow space is tightly fitted.

3. Master track link as set forth in claim 2, wherein; said cylindrical hollow space has an enlarged diameter portion at its intermediate part in which a traction and thrust bearing means corresponding to said hollow space is tighly fitted.

4. Master track link as set forth in claim 2, wherein; said traction and thrust bearing means is a knock pin.

5. Master track link as set forth in claim 1, further comprising;
a recessed portion formed in said other link part at its outer surface coming into contact with the inner surface of said track shoe, and
at least one additional bolt extending from the bottom face of said recessed portion to said one link part while passing through said the other link part so that both the link parts are always coupled and interlocked by said additional bolt even when said track shoe is detached from said master track link by taking off said shoe bolts.

6. Master track link as set forth in claim 5, wherein; each of said respective intermediate surface parts of said mating surfaces of said link parts is provided with at least a cavity which registers with another corresponding complementing cavity in the associated link part so as to form a hollow space in which a traction and thrust bearing means corresponding to said hollow space is tightly fitted when said link parts are coupled and interlocked with each other.

7. Master track link as set forth in claim 6, wherein; said hollow space is a substantially cylindrical configuration in which a traction and thrust bearing means corresponding to said hollow space is tighly fitted.

8. Master track link as set forth in claim 7, wherein; said cylindrical hollow space has an enlarged diameter portion at its intermediate part in which a traction and thrust bearing means corresponding to said hollow space is tightly fitted.

9. Master track link as set forth in claim 7, wherein; said traction and thrust bearing means is a knock pin.

10. Master track link as set forth in claim 1 wherein said thrust bearing means is solid.

* * * * *